United States Patent
Tokvam et al.

[11] Patent Number: 5,473,628
[45] Date of Patent: Dec. 5, 1995

[54] DEVICE FOR RING SECTION FURNACE

[75] Inventors: Gudmund Tokvam, Billingstad; Tormod Naterstad, Asker, both of Norway

[73] Assignee: Norsk Hydro a.s., Oslo, Norway

[21] Appl. No.: 972,892

[22] Filed: Nov. 6, 1992

[30] Foreign Application Priority Data

Nov. 6, 1991 [NO] Norway .................................. 914341

[51] Int. Cl.⁶ .................................................. F27D 7/06
[52] U.S. Cl. ............................ 373/110; 373/71; 432/18; 432/192
[58] Field of Search ................................ 373/110, 115, 373/23, 120, 89, 94, 72, 80, 78, 73, 71; 202/85, 19, 27, 34; 75/10.19, 10.22; 432/192, 18, 164, 168, 83, 84, 9

[56] References Cited

U.S. PATENT DOCUMENTS

| | | | |
|---|---|---|---|
| 1,133,885 | 3/1915 | Richardson | 373/110 |
| 1,612,127 | 12/1926 | Johnson | 373/110 |
| 2,158,765 | 5/1939 | Stewart | 432/192 |
| 4,040,778 | 8/1977 | Black | 432/192 |
| 4,253,823 | 3/1981 | Holdner | 432/18 |
| 4,382,778 | 5/1983 | Peacey et al. | 432/18 |
| 4,470,804 | 9/1984 | Geijer et al. | 432/9 |
| 4,552,530 | 11/1985 | Gunnes et al. | 432/192 |
| 4,736,383 | 4/1988 | Meierling | 373/78 |

*Primary Examiner*—Tu Hoang
*Attorney, Agent, or Firm*—Wenderoth, Lind & Ponack

[57] ABSTRACT

A ring section furnace device for the calcination of carbon bodies includes a number of serially connected chambers with or without lids on top. Each chamber contains a number of cassettes the walls of which have therein vertical and/or horizontal flue gas channels. A flue gas exhaust system from each chamber leads to a main ring duct. The furnace is fitted with an additional, separately attached ring duct, and each of the chambers is fitted with a recovery device in the form of a lid, manifold, or a similar device with a closeable opening or joining pipe, which allows for exhaust removal of the air used for cooling the cassettes through a pipe connection fitted between the additional ring duct and the recovery device on the chamber.

6 Claims, 4 Drawing Sheets

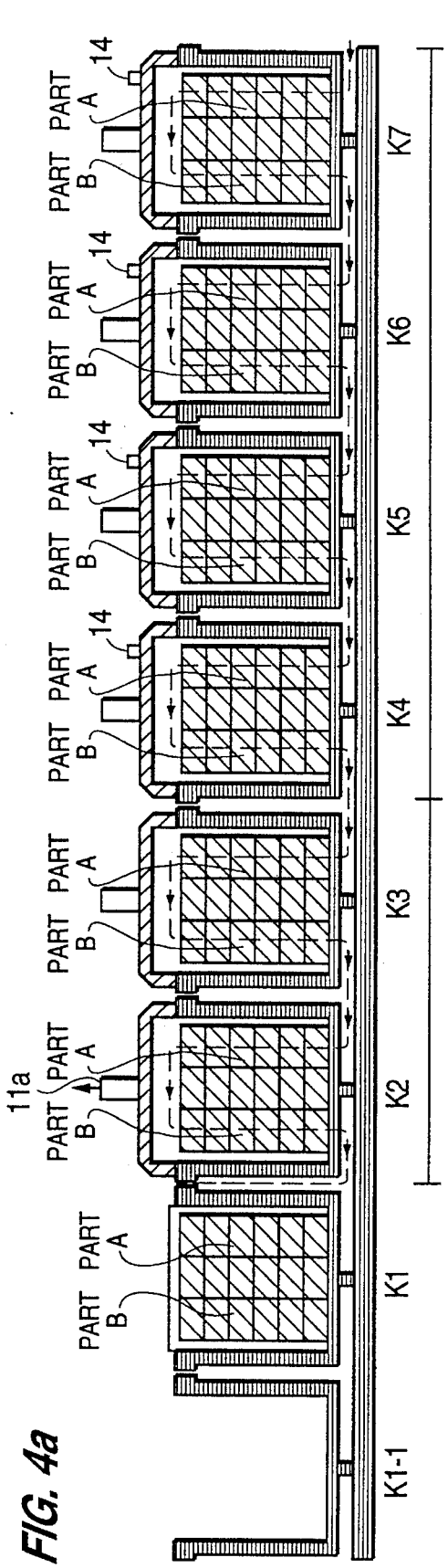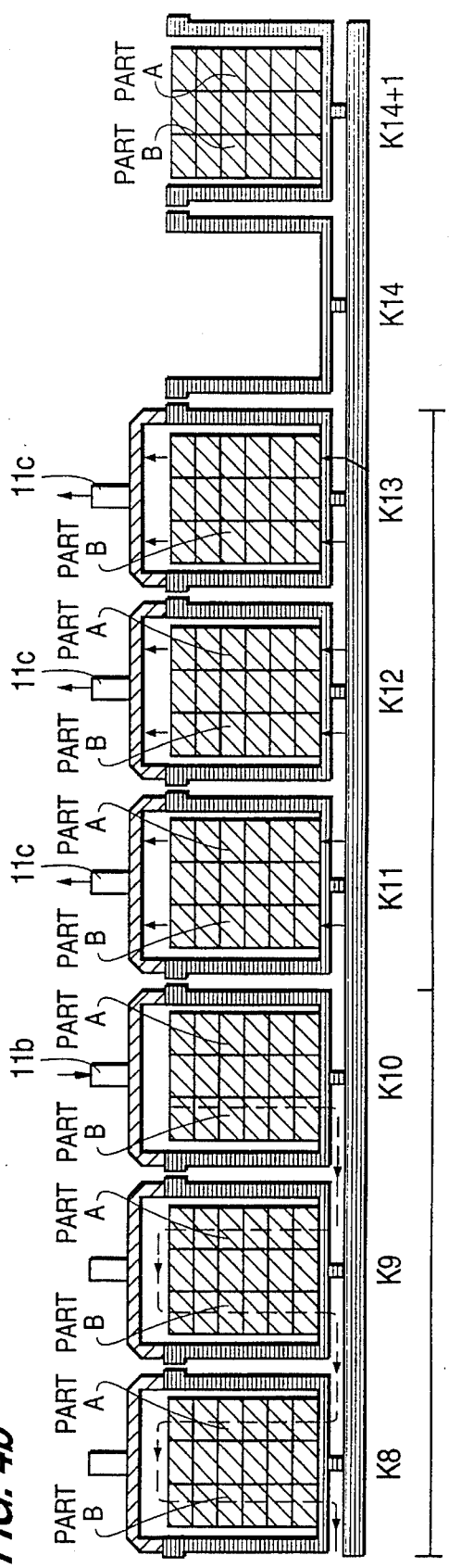
FIG. 4a
FIG. 4b

DEVICE FOR RING SECTION FURNACE

BACKGROUND OF THE INVENTION

The present invention relates to a ring section furnace device for the calcination of carbon bodies including a number of serially connected chambers, each containing several cassettes, the walls of which are fitted with vertical and/or horizontal flue gas channels and with a gas exhaust system through a ring duct.

For the production of carbon bodies for furnaces for aluminum electrolysis or electro-metallurgical processes, special furnaces are used for thermal treatment (baking or calcination) of the carbon bodies.

The carbon bodies are produced in the required shape from a mixture of crushed coke or anthracite and a binding agent containing, for example, coal tar and pitch.

At room temperature this mixture of coke and binding agent is stiff, but it softens at temperatures above 120° C. and release's low-volatile components from the binding agent. At prolonged heating to a maximum of 1300° C., the mass hardens and changes its physical properties such as electrical conductivity and resistance to oxidation.

Uncalcinated carbon bodies are often called "green carbon". Such green carbon can be of a considerable weight of several tonnes and of lengths of two meters or more. Special measures must be implemented in order to prevent deformation of the coal when it passes through a temperature range at which the coal is in its soft state.

The green carbon is placed in the furnace in deep shafts known as pits or cassettes, which are defined by walls built of fireproof brick. The gap between the coal and the cassette walls is filled with coke to support the coal. The coke gravel also serves to protect the coal from burning.

A number of cassettes are connected to each other in a so-called chamber. The walls between the cassettes are fitted with flue gas channels. Heat is transferred to the coal by the gases being passed through these channels.

Gases from one chamber are led via channels to the adjoining chambers. In this way the gases can be led through a number of serially connected chambers in a so-called combustion zone. The most frequently used fuels are oil or gas.

Flue gas discharge and burner equipment are moved from chamber to chamber.

A large furnace is often fitted with two rows with the chambers connected to each other as parallel rows. At the end of a chamber row the gas flows are connected with channels to the parallel chamber row. In this way the chambers form a ring. For this reason this type of furnace for baking carbon bodies is known as a ring section furnace.

A ring section furnace may contain several combustion zones in which the temperature is adjusted in accordance with a set program. The first chambers in a combustion zone have low temperatures. After these follow chambers with higher temperatures, chambers for heat recovery and, as the final link in the combustion zone, chambers in which the coal is cooled. Ring furnaces for thermal treatment of carbon bodies can be divided into two main categories, closed and open furnaces.

In a conventional closed design the space above each chamber is covered with lids. Such lids are removed when the chambers are to be cooled with a subsequent insertion of green carbon after the calcinated carbon bodies have been removed.

Due to the special properties of the carbon bodies, it is necessary to avoid excessive temperature gradients during calcination which would result in cracks in the finished product. Each chamber must consequently be operated in accordance with an exact time and temperature program.

Heat supply usually takes place in the first part of the zone, i.e. up to 600° C., by using the gas heat from the last part of the combustion zone. At a later stage in the temperature interval, from 600° C. to the required maximum temperature (1200°–1300° C.), it becomes necessary to add heat through the above-mentioned combustion of gas or oil.

In the cooling area the cassette walls are cooled with air until the carbon bodies can be removed without any risk of oxidation. The furnace has been designed for maximum utilization of the heat which is absorbed by the cooling air by passing the surrounding air through 1–3 chambers during cooling and onwards into the combustion zone where it is used as combustion air.

The combustion zone is moved by moving the oil or gas burners from one chamber to the next. The frequency of this relocation is known as the heating progress and determines the combustion zone capacity.

As mentioned, it must also be possible for each chamber to be connected to an exhaust system when the chamber is to be connected to the combustion zone. This connection is generally established by fitting an exhaust pipe or manifold, possibly with a fan, between the chamber in question and a joining pipe at the exhaust duct surrounding the furnace. This exhaust duct is known as the ring duct and is kept under ventilating pressure by a main fan.

In the invention in question, for closed furnaces connection to the chamber takes place on the chamber lid itself. For open furnaces recovery devices in the form of manifolds are connected to openings in the part walls between the chambers.

In closed ring section furnaces several cassettes are built together in one chamber under a joint lid. In relation to the flue gases and the material which is to be calcinated, the cassettes in a chamber are connected in parallel, whereas the chambers are serially connected. There are horizontal flue gas channels in the room or space below the chamber, whereas there is free gas flow in the room or space below the chamber lid above the cassettes. The gas channels in the cassette walls connect the room below the chamber lid and the rooms below the chamber. In closed ring section furnaces the flue may be supplied either in separate vertical furnace shafts or preferably by the flue being added fully or in part to the room above or below the cassettes as shown in Norwegian Patent No. 150,029 (corresponding to U.S. Pat. No. 4,552,530).

In closed furnaces without furnace shafts the channels in each cassette wall are divided into two by a dividing wall in the room below the cassettes. The flue gases are consequently led up through one half of the wall and down through the other half of the wall. In open furnaces the chambers are serially connected with parallel connection of flue gas flow above or below the individual chamber.

Before the gases reach the main fan, they normally pass through a purifying plant in which soot, tar fumes and other impurities are removed.

In order to increase the speed of cooling of for the carbon bodies in the cassettes, individual cooling fans are used which either force or suck out the surrounding cooling air through the flue gas channels.

This cooling air cannot be led into the combustion zone in its entirety as it would disturb the pressure conditions and gas quantity balance in the system. It is consequently let out into the surrounding factory.

In this connection the chamber lids in the familiar design with closed furnaces are removed from the chambers to which cooling fans are attached. In open furnaces manifolds which force or suck cooling air through the cassette wall are fitted on the cassette walls and/or on the part walls between the chambers. This can only be done when the temperature in the cassettes has fallen below a certain level.

The cooling air which is let out in this way contains impurities such as $SO_2$, soot and ash components from the coke used. These impurities contribute to a deterioration of the working environment and increase polluting emissions into the environment.

SUMMARY OF THE INVENTION

The present invention provides a separate, additional ring duct to which each individual chamber can be attached during the cooling phase. For open furnaces a recovery device is fitted on the cassette wall and/or part wall by a joint manifold, which can be connected to the additional ring duct for cooling via a pipe connection or a similar device, whereas for closed furnaces a pipe connection is fitted between the existing lid and the additional ring duct. The separate additional ring duct is under ventilating pressure from a main fan.

With this solution a closed furnace can be run through the entire cooling phase and the furnace charge can be kept under low ventilating pressure until the carbon bodies can be removed. By having the cooling air led to the additional ring duct in both cases, polluting emissions into the working environment are avoided and the noise level in the surrounding factory or building is considerably reduced.

In addition, this solution makes it possible to use a more simple arrangement for purification of the cooling air than those which have previously been known.

The cooling process is controlled automatically by the cooling air being led through the flue gas channels in the cassettes via the manifold/pipe connections with adjustable air dampers to the separate additional ring duct.

By applying such cooling process control, thermal shocks are avoided, i.e. temperature gradients in the fire-proof constructions which could lead to crack formation and deformation and, consequently, to increased maintenance.

Furthermore, the solution of the invention allows for a built-in heat recovery plant for recovering the heat contained in the cooling air.

For the closed furnace design direct exhaust from the lid has the effect that it becomes possible to eliminate the costs incurred in building a separate exhaust channel in each chamber or in the use of a separate manifold above the chamber.

BRIEF DESCRIPTION OF THE DRAWINGS

In the following a more detailed description of the invention will be made by the use of an example of a closed furnace construction and with reference to the attached drawings, in which:

FIGS. 4a and 4b are views similar to FIGS. 3a and 3b but showing a combustion zone in connection with cooling of carbon bodies in accordance with the invention.

DESCRIPTION OF THE INVENTION

Figure 1:
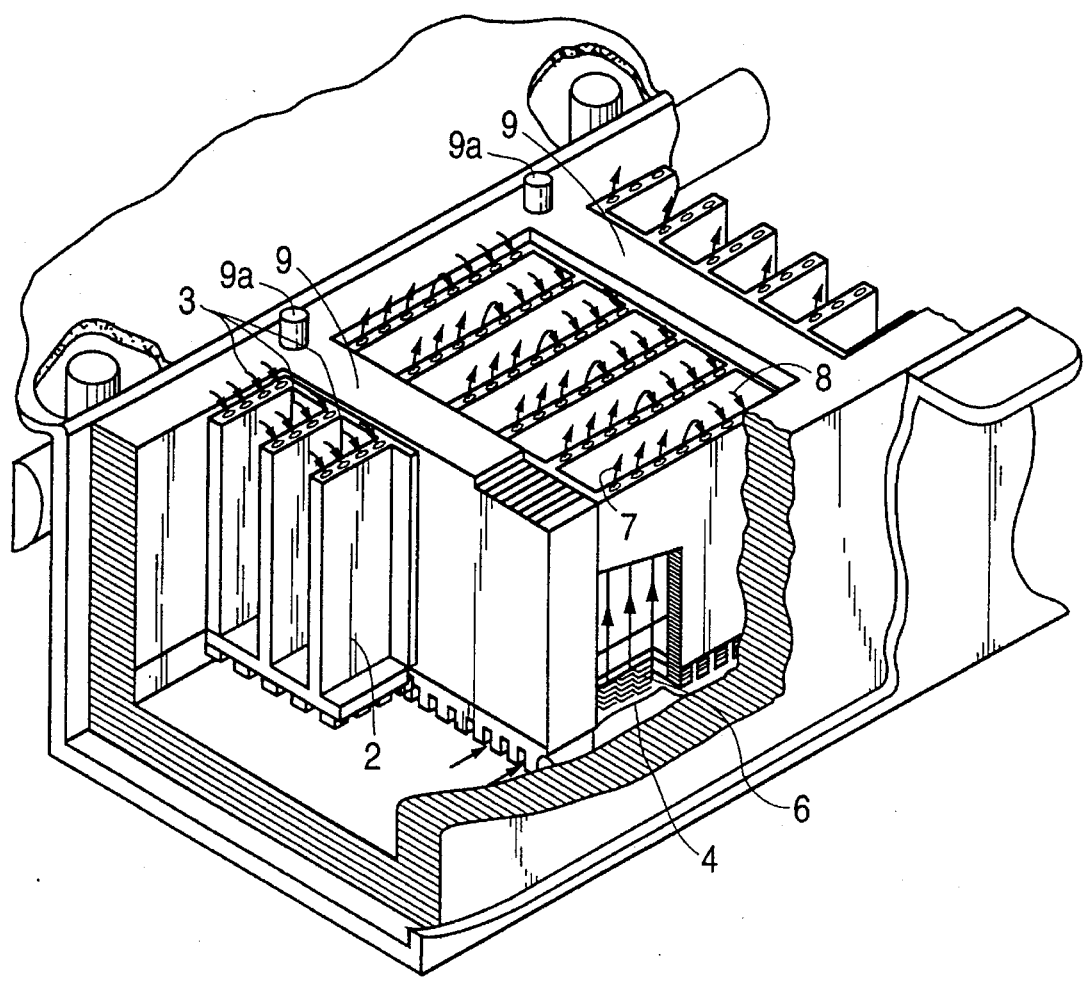
FIG. 1 a perspective view of a chamber of conventional design with a separate exhaust channel to a ring duct a lid not be shown.

FIG. 1 shows a cross-section of a conventional chamber of a ring chamber furnace and including pit or cassette walls 2 and flue gas channels 3. Under the bottom of the pit or cassettes a dividing wall 6 which divides in two a space or room 4 below the cassettes into two. As a result of this, gases are led through the flue gas channels, upwardly through one group 7 thereof and downwardly through another group 8 thereof.

During operation a lid is placed on top of the chamber wall 9. This lid has not been shown, but it will ensure the necessary channeling of the flue gases.

From the room below the cassettes a channel (not shown) leads to a joining pipe 9a on the top of the furnace. In the conventional furnace design these are used for connecting the individual chambers to a main ring duct 10.

Figure 2:
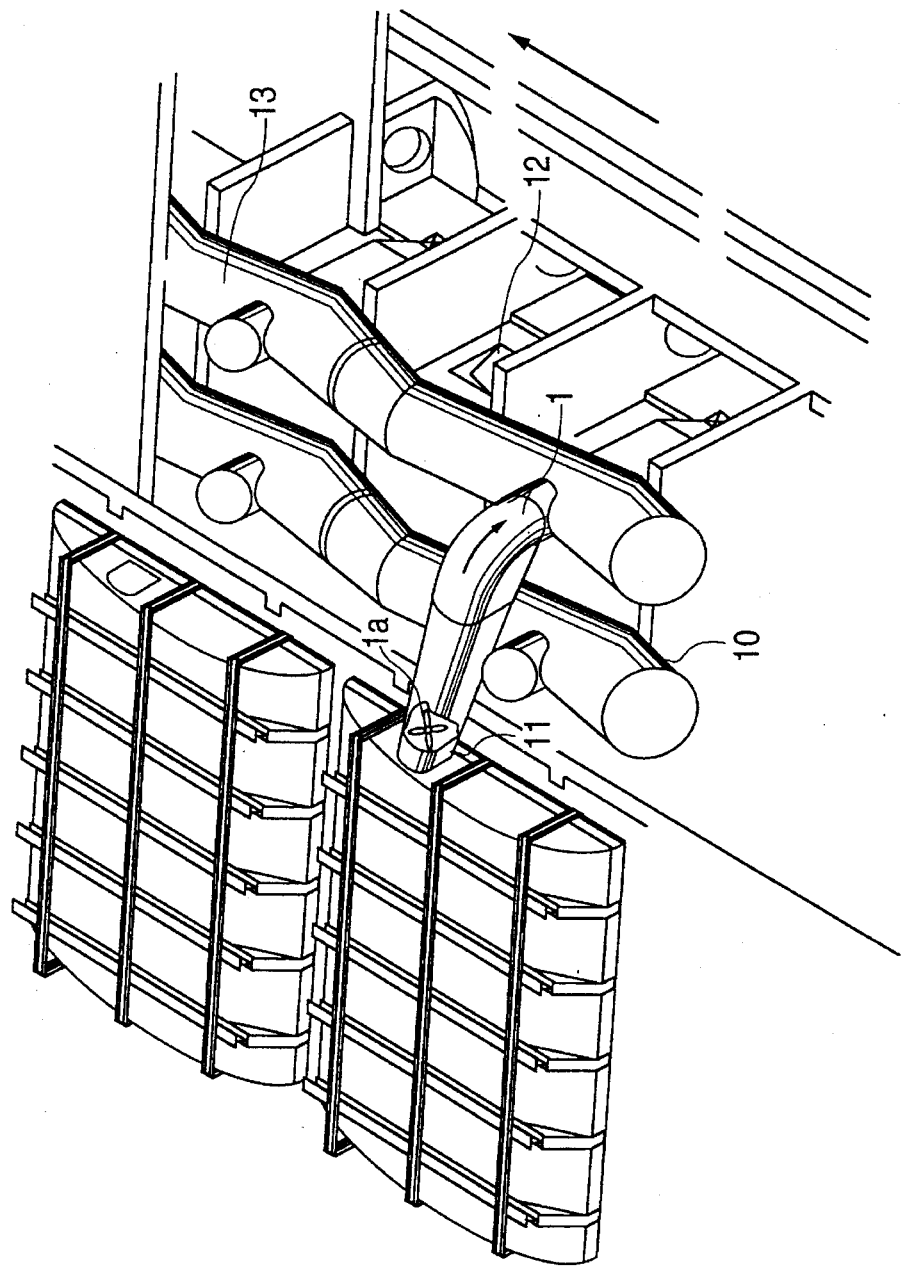
FIG. 2 a perspective view of a chamber in accordance with the invention in which exhaust removal takes place via a lid.

FIG. 2 shows two chambers with lids in which connection of each chamber to the ring duct is fitted on the lid in accordance with the present invention. In the illustrated example, the lower shown chamber is being cooled and the lid thereof is connected to a separate additional ring duct 13 via a pipe connection 1. During heating, the lid will be connected to the ordinary ring duct 10.

Figure 3A:
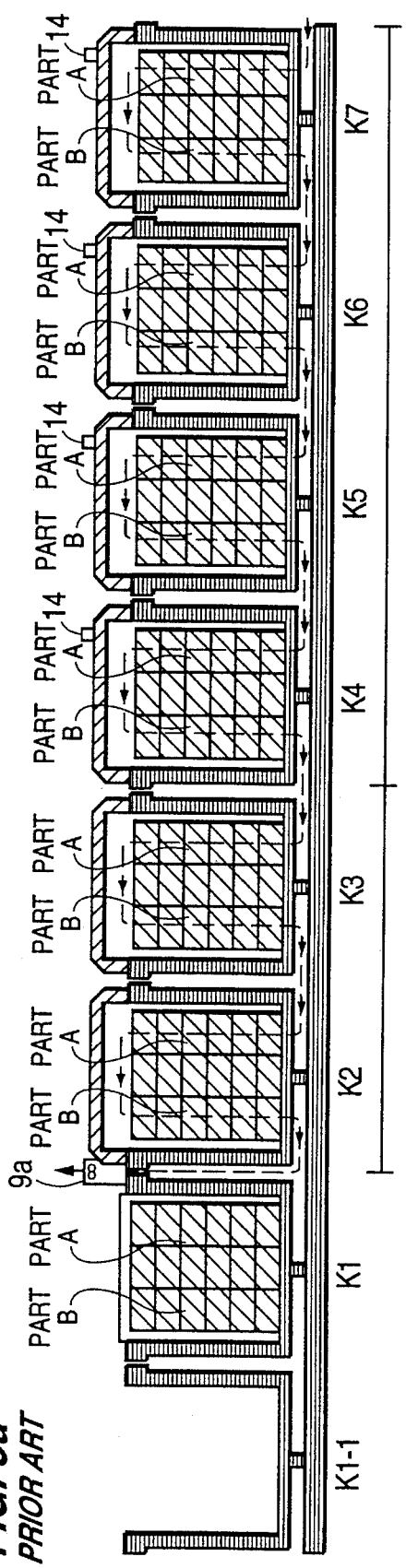
FIGS. 3a and 3b are schematic views showing a combustion zone in connection with conventional cooling of carbon bodies.
Figure 3B:
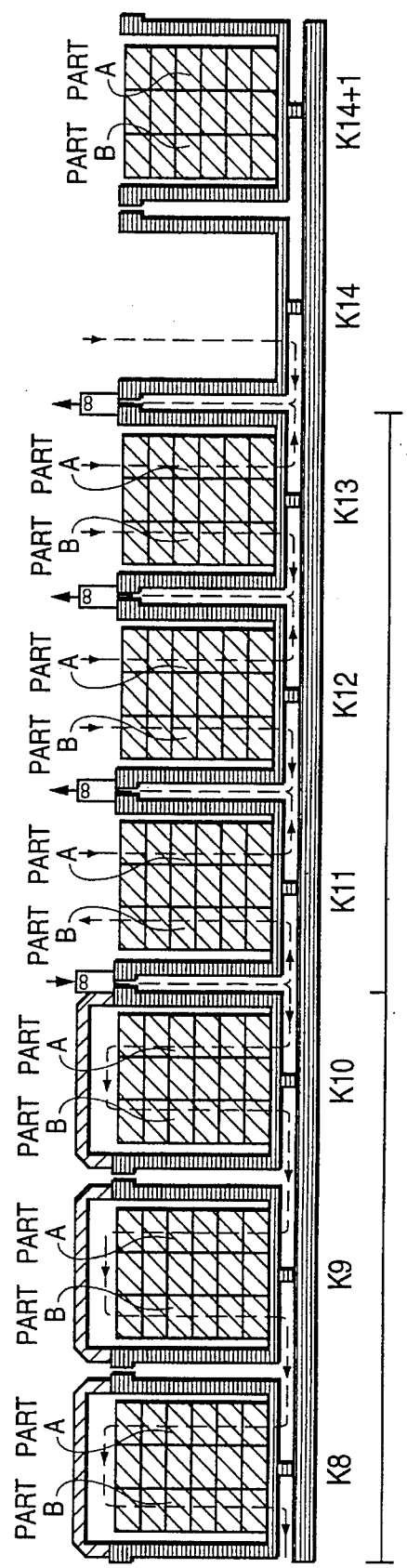

FIGS. 3a and 3b show a section of a combustion zone with conventional operation. The combustion zone is connected to the ring duct 10 via the indicated pipe coupling 9a to a chamber K2 in which the flue gases are withdrawn. Chambers K2 and K3 are being heated by the flue gases, chambers K4–K7 are under combustion as indicated by burners 14, chambers K8–K10 are being cooled with the lids on, whereas chambers K11–K13 are under forced cooling without lids.

The cooling air which contains various impurities and considerable quantities of heat is discharged into the surrounding plant. Carbon is being loaded and unloaded respectively in chambers K1 and K14.

The combustion air to the combustion zone is supplied to the furnace by the cooling air forced into chamber K11 being split and part of it being led into chamber K10 and further on into the combustion zone as combustion air.

FIGS. 4a and 4b show a section of a combustion zone with an operating situation in accordance with the present invention and with the combustion chambers in the same phases as in FIGS. 3a and 3b. Here the coupling of the ring duct 10 and an individual chamber is respective exhaust outlets and achieved through the chamber lid itself by joining pipe 11 (FIG. 2) attached to the lid and which can be opened and closed as required. Combustion air to the combustion zone is supplied to chamber K10 through the joining pipe 11b on the lid thereof.

The lids are kept on chambers K11, K12 and K13 which are under forced cooling, and exhaust is established from each such chamber by connection to the separate ring duct 13 via the respective exhaust outlets and joining pipes 11c. The pipe connection 1 between the ring duct 13 and the lid is fitted with an air damper, which allows automatic control of the quantity of cooling air and the cooling process, and may include a fan 1a as shown schematically in FIG. 2. The cooling air is let in through appropriately placed gates 12, see FIG. 2, (which can be opened and closed) in the bottom of the chambers and/or in the pit walls.

What is claimed is:

1. In a ring section furnace including a plurality of serially connected chambers, each said chamber having a plurality of pits defined by walls having therein flue gas channels, and a main ring duct exterior of said chambers, whereby a heat treatment operation is conducted serially sequentially within said chambers on respective products to be loaded therein, during which operation each chamber sequentially is heated, during which flue gases therein are exhausted therefrom to said ring duct, and then is cooled by air introduced into said each chamber, during which said air absorbs heat, the improvement comprising:

each said chamber having an outlet having connected thereat an exhaust device;

an additional ring duct separate from said main ring duct; and means for, when a given said chamber is being heated, transferring flue gases exhausted therefrom through said outlet and said exhaust device thereof into said main ring duct, and for, when said given chamber is being cooled, transferring heated air therein to said additional ring duct.

2. The improvement claimed in claim 1, wherein each said chamber has thereon a lid having therein the respective said outlet and from which extends the respective said exhaust device.

3. The improvement claimed in claim 1, wherein said means comprises a pipe leading from said exhaust device of said given chamber and selectively connectable to said main ring duct or said additional ring duct.

4. The improvement claimed in claim 3, wherein said pipe has therein an adjustable damper.

5. The improvement claimed in claim 3, wherein said pipe has therein at least one fan.

6. The improvement claimed in claim 1, wherein each said chamber further has a selectively operable gate for introduction of the air.

* * * * *